United States Patent
Krichevsky et al.

(10) Patent No.: US 12,517,312 B2
(45) Date of Patent: Jan. 6, 2026

(54) SYSTEMS AND METHODS FOR WAFER LEVEL BEAM PROFILE CHARACTERIZATION

(71) Applicant: Intel Corporation, Santa Clara, CA (US)

(72) Inventors: Alexander Krichevsky, Cupertino, CA (US); Christopher Seibert, Albuquerque, NM (US); David Gold, Pleasanton, CA (US); Hari Mahalingam, San Jose, CA (US); Jonathan Doylend, Morgan Hill, CA (US)

(73) Assignee: Intel Corporation, Santa Clara, CA (US)

( * ) Notice: Subject to any disclaimer, the term of this patent is extended or adjusted under 35 U.S.C. 154(b) by 872 days.

(21) Appl. No.: 17/553,827

(22) Filed: Dec. 17, 2021

(65) Prior Publication Data

US 2022/0107472 A1    Apr. 7, 2022

(51) Int. Cl.
*G02B 6/42*    (2006.01)
*G02B 26/10*   (2006.01)

(52) U.S. Cl.
CPC ......... *G02B 6/4214* (2013.01); *G02B 6/4221* (2013.01); *G02B 26/108* (2013.01)

(58) Field of Classification Search
CPC ..... G02B 6/4214; G02B 6/4221; G02B 6/108
See application file for complete search history.

(56) References Cited

U.S. PATENT DOCUMENTS

| | | | | |
|---|---|---|---|---|
| 6,370,292 B1* | 4/2002 | Strake | ...................... | G02B 6/10 385/14 |
| 6,987,906 B2* | 1/2006 | Nakama | ................... | G02B 6/42 385/15 |
| 2006/0023990 A1* | 2/2006 | Shih | ...................... | G02B 6/4214 385/14 |
| 2006/0056765 A1* | 3/2006 | Hwang | ................... | G02B 6/43 385/39 |
| 2006/0188201 A1* | 8/2006 | Kotake | ..................... | G02B 6/42 385/88 |
| 2010/0265983 A1* | 10/2010 | Adachi | ..................... | H01S 5/18 372/50.23 |
| 2020/0098486 A1* | 3/2020 | Coenen | ............... | G03F 7/70158 |
| 2022/0066103 A1* | 3/2022 | Oyama | .................. | G02B 6/383 |

FOREIGN PATENT DOCUMENTS

KR    20110025774 A    *    6/2009    ........... G02B 6/4214

* cited by examiner

*Primary Examiner* — Thomas A Hollweg
*Assistant Examiner* — Marc E Manheim
(74) *Attorney, Agent, or Firm* — Viering, Jentschura & Partner mbB

(57) ABSTRACT

An apparatus includes an aperture disposed through an outer layer, a folding prism adjacent to the aperture, and a multi-mode optical fiber on which the folding prism is disposed. The aperture and the folding prism are insertable into a trench disposed through a waveguide of an edge emitting integrated laser, the aperture is configured to allow a light beam that is emitted by the waveguide, through the aperture, and the folding prism is configured to redirect the allowed light beam to the multi-mode optical fiber.

16 Claims, 7 Drawing Sheets

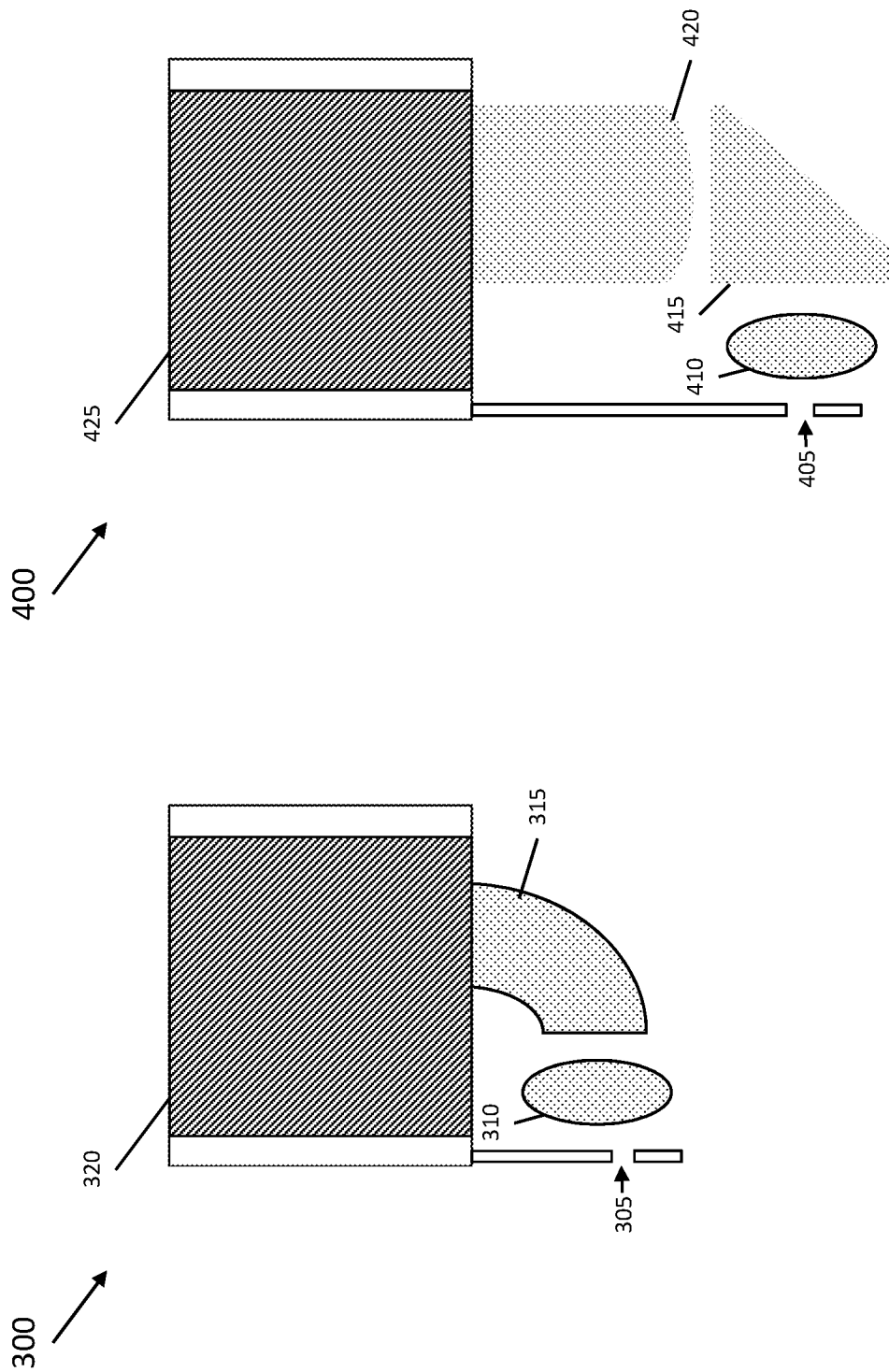

SYSTEMS AND METHODS FOR WAFER LEVEL BEAM PROFILE CHARACTERIZATION

BACKGROUND

Optical characterization of light beams emitted from lasers and waveguides that are integrated may include obtaining numerical apertures (NAs), tilts and M squared beam quality factors of the light beams. There are multiple ways to characterize the light beams, which can be divided into scanning methods and imaging methods. The cheapest and the most commonly used devices for beam profile characterization are slit or aperture scanning beam profilers in which a slit or aperture is used to scan across light beams at a predetermined distance from a source of the light beams, thereby mapping a light intensity distribution. Slit profilometers may use a rotating slit or two independent slits for horizontal and vertical scans. A beam profile is restored by deconvolution of the scanned image from an aperture or slit shape. Measuring beam profiles at several distances from the source allow characterization of a tilt of a chief light ray and an M squared beam quality factor of a light beam. Another scanning technique is called a "knife-edge" in which one of obscurations of a slit is removed. Horizontal and vertical beam profiles are derivatives of the respective scanned profiles. Imaging methods rely on reimaging a beam waist, onto a electronic recording array, e.g. a charge-coupled device (CCD) camera.

All of the above-mentioned solutions are too big and bulky to perform beam profile characterization at a wafer level of an integrated laser and waveguide. Also, the imaging techniques are often limited by a clear aperture of a relay lens, and thus not suitable for large numerical aperture (NA) light beams.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the present disclosure. The dimensions of the various features or elements may be arbitrarily expanded or reduced for clarity. In the following description, various aspects of the present disclosure are described with reference to the following drawings, in which:

FIGS. 3-6 show cross-section views of apparatuses for wafer level beam profile characterization according to other aspects of the present disclosure.

DETAILED DESCRIPTION

Figure 1B:
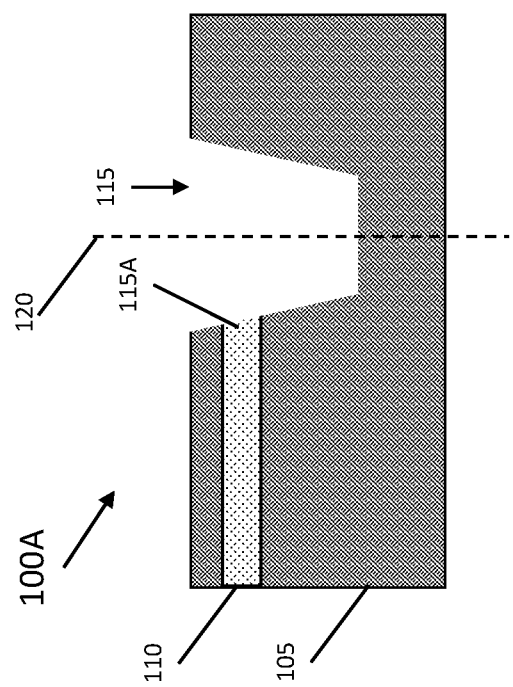
FIG. 1B shows a cross-section view of the edge emitting integrated laser of FIG. 1A after dicing.

The following detailed description refers to the accompanying drawings that show, by way of illustration, specific details and aspects in which the present disclosure may be practiced. These aspects are described in sufficient detail to enable those skilled in the art to practice the present disclosure. Various aspects are provided for devices, and various aspects are provided for methods. It will be understood that the basic properties of the devices also hold for the methods and vice versa. Other aspects may be utilized and structural, and logical changes may be made without departing from the scope of the present disclosure. The various aspects are not necessarily mutually exclusive, as some aspects can be combined with one or more other aspects to form new aspects.

The present disclosure generally relates to a deep (approximately 50 microns or more) cavity or trench etched in a wafer at and through a waveguide of an edge emitting integrated laser. A miniaturized scanning probe is inserted in the trench, allowing wafer level beam profile characterization. The probe may include an aperture followed by a folding prism, a lens and a curved light pipe, or one or more lenses and a folding prism. Alternatively, the probe may include an aperture-free folding microprism followed by an imaging system.

A present apparatus may include an aperture disposed through an outer layer, a folding prism adjacent to the aperture, and a multi-mode optical fiber on which the folding prism is disposed. The aperture and the folding prism are insertable into a trench disposed through a waveguide of an edge emitting integrated laser, the aperture is configured to allow a light beam that is emitted by the waveguide, through the aperture, and the folding prism is configured to redirect the allowed light beam to the multi-mode optical fiber.

In another aspect, a method pursuant to the present disclosure may include providing an aperture disposed through an outer layer, providing a folding prism adjacent to the aperture, and providing a multi-mode optical fiber on which the folding prism is disposed. The method may further include inserting the aperture and the folding prism into a trench disposed through a waveguide of an edge emitting integrated laser, and allowing a light beam that is emitted by the waveguide, through the aperture, the folding prism redirecting the allowed light beam to the multi-mode optical fiber.

In yet another aspect, a present apparatus may include a folding prism insertable into a trench disposed through a waveguide of an edge emitting integrated laser, and configured to redirect a light beam that is emitted by the waveguide, a collimating lens configured to narrow the redirected light beam, and a variable focus lens configured to change a focal length of the narrowed light beam. The apparatus may further include a camera configured to image the light beam having the changed focal length.

The above-described aspects allow for a differentiating manufacturing capability as they enable quick and low-cost beam profile characterization at a wafer level. Testing at the wafer level improves throughput and reduces cost, by enabling near-perfect screening as compared to prior sampling and monitoring. The above-mentioned trench and probe are scalable for screening a high number of outputs per device, which may be critical in multi-channel light detecting and ranging (Lidar) products.

Further, the above-described aspects enable screening of beam quality much earlier in a manufacturing flow as compared to in a packaged box, at a system level and at a die level. Efficient collection of statistical data may be performed without a need for sample preparation or relatively slow, labor-intensive die-level data collection.

Figure 1A:
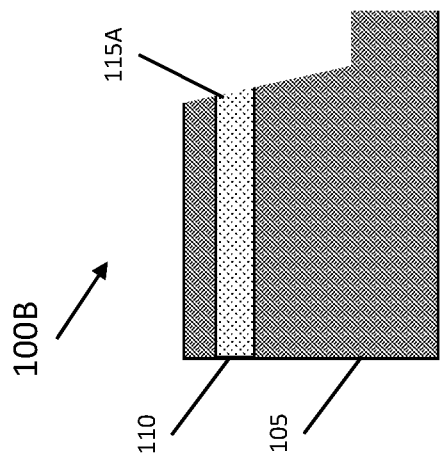
FIG. 1A shows a cross-section view of an edge emitting integrated laser according to aspects of the present disclosure.

FIG. 1A shows a cross-section view of an edge emitting integrated laser 100A according to aspects of the present disclosure. FIG. 1B shows a cross-section view of the edge emitting integrated laser 100B of FIG. 1A after dicing.

Referring to FIG. 1A, the edge emitting integrated laser 100A includes a wafer 105 and a waveguide 110 embedded in the wafer 105. The edge emitting integrated laser 100A emits light provided by an edge-emitting semiconductor laser (i.e., a beam of light) through the waveguide 110.

A trench 115 or cavity is disposed by etching through a surface of the wafer 105 and the waveguide 110. The trench 115 may be deep, e.g., approximately 40 microns or more.

Referring to FIGS. 1A and 1B, the edge emitting integrated laser 100A is then diced into chips at a dice line 120 that is at least a few microns away from an etched wall 115A of the trench 115.

The etched wall 115A may be sloped as it may be difficult to reliably etch a vertical wall. This slope causes a light beam emitted by the edge emitting integrated laser 100A to refract at a tilt angle that is not well-controlled from a nominal level. Also, the high-index waveguide 110 combined with a small aperture of the waveguide 110 may create a fast-diverging, high NA light beam. Both the beam tilt and the high NA make beam profile characterization challenging using imaging methods even after the wafer 105 is diced. None of existing methods is suitable for wafer level characterization as a beam may be pointing down and interrupted by another edge of the trench 115.

Figure 2A:
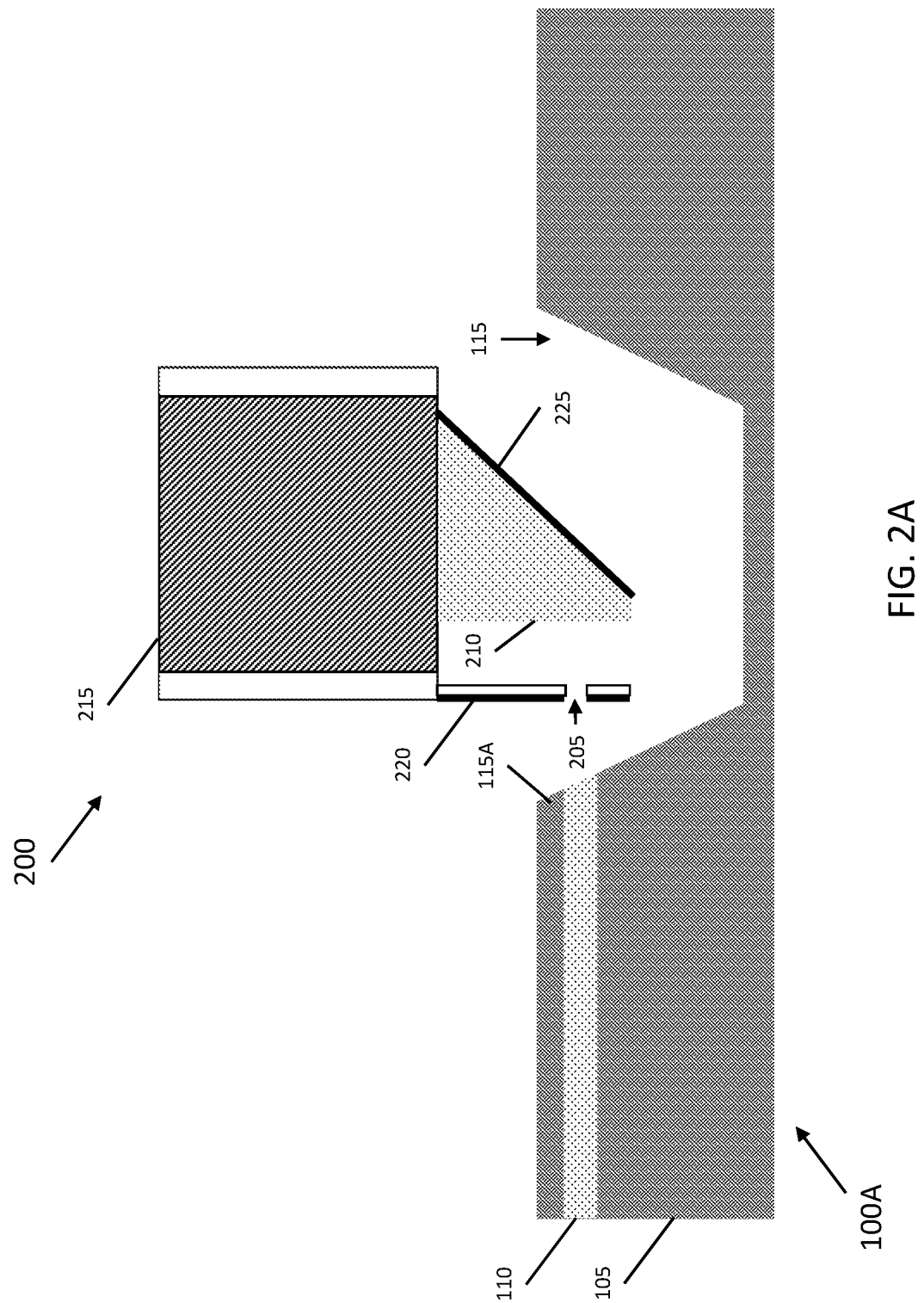
FIG. 2A shows a cross-section view of an apparatus for wafer level beam profile characterization according to aspects of the present disclosure.
Figure 2B:
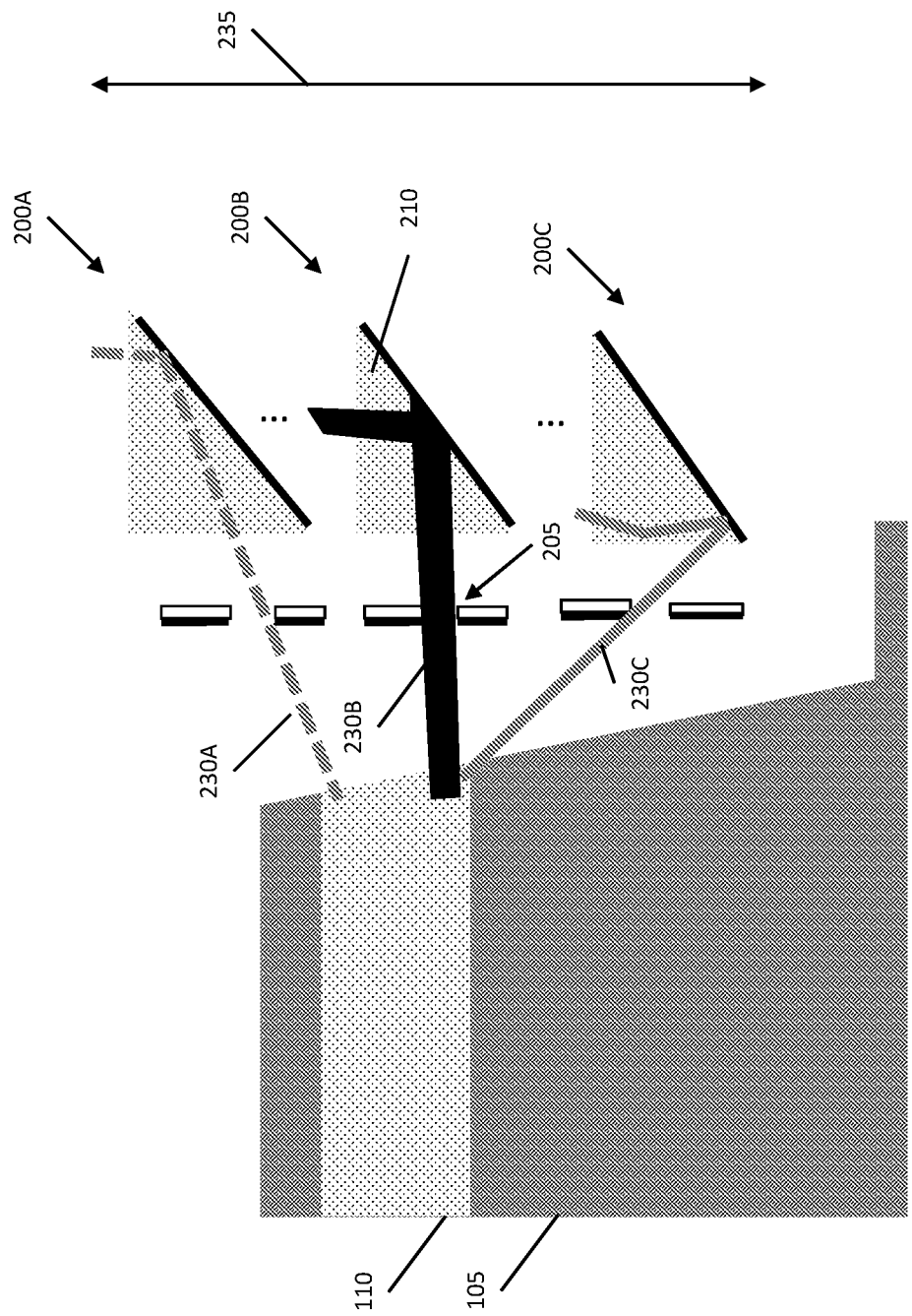
FIG. 2B shows a zoomed view of the apparatus of FIG. 2A on which light beams are incident during scanning.
Figure 2C:
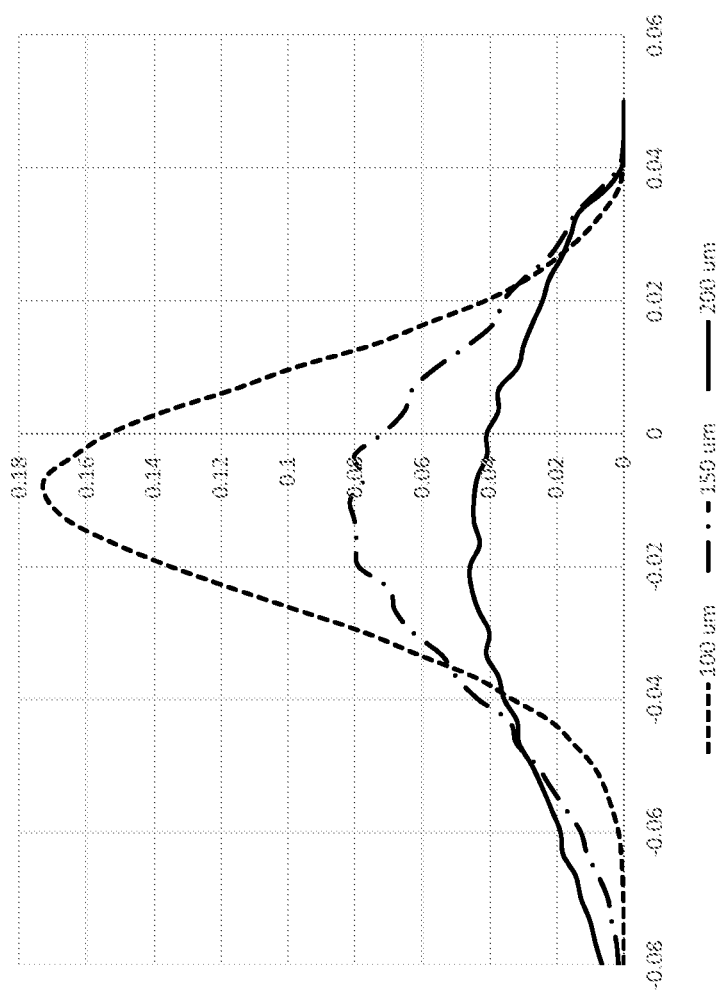
FIG. 2C shows a graph of measured light intensity profiles for different distances from a source to a probe.

FIG. 2A shows a cross-section view of an apparatus 200 for wafer level beam profile characterization according to aspects of the present disclosure. FIG. 2B shows a zoomed view of the apparatus 200 of FIG. 2A on which light beams are incident during scanning. FIG. 2C shows a graph of measured light intensity profiles from a source to a probe.

Referring to FIG. 2A, the apparatus 200 includes an aperture 205, a folding prism 210, a multi-mode optical fiber 215, and metal layers 220 and 225.

The apparatus 200 is insertable into the trench 115 and to be adjacent to the etched wall 115A of the trench 115 so that the aperture 205 is adjacent to the waveguide 110. The aperture 205 allows passage of a light beam having relatively small (acute) angles of emission from the waveguide 110, through the aperture 205. In embodiments, the aperture 205 may be a hole disposed through an outer layer of plastic, one end of the plastic being physically attached to a cleaved face of the multi-mode optical fiber 215.

The folding prism 210 is adjacent to the aperture 205, arrests divergence of the light beam passed through the aperture 205, and redirects or reflects the light beam to be incident on a core of the multi-mode optical fiber 215 at relatively small (acute) angles with respect to an optical axis of the multi-mode optical fiber 215. The redirected light beam may reach the core of the multi-mode optical fiber 215 at an angle smaller than an NA of the multi-mode optical fiber 215. Therefore, the design may be robust and fault-tolerant. Values of the NA for the step-index multi-mode optical fiber 215 may be in a range of about 0.25-0.5, corresponding to a core diameter 40-200 microns. In embodiments, the folding prism 210 may be physically attached to a bottom surface of the multi-mode optical fiber 215. The folding prism 210 can be 3D printed or formed out of a single piece of silicon by etching. The folding prism 210 is sharp enough to be insertable into the trench 115. That is, a cross-sectional width of the folding prism 210 is less than a cross-sectional width of the trench 115.

The metal layer 220 may be disposed on the plastic through which the aperture 205 is disposed, and may block or reflect a light beam having a relatively large angle of emission from the waveguide 110. The metal layer 225 may be disposed on a bottom surface of the folding prism 210, and may reflect the light beam passed through the aperture 205 and into the folding prism 210, to be incident on the core of the multi-mode optical fiber 215. In embodiments, the metal layers 220 and 225 may include metal with reflective properties at a required wavelength, such as, e.g., aluminum.

The apparatus 200 may be moved in x-, y- and z-directions within the trench 115 to scan the light beam, to capture a beam profile of the scanned light beam and to perform wafer level beam profile characterization of the captured beam profile by obtaining an NA and a tilt of the scanned light beam. The fiber 215, the folding prism 210, and the aperture 205 may move as one piece during scanning.

Referring to FIG. 2B, the aperture 205 allows different lights beams 230A, 230B and 230C to pass therethrough at respective positions 200A, 200B and 200C of the apparatus 200 during a scanning process 235. The different light beams 230A, 230B and 230C are reflected differently in the folding prism 210 to a bottom surface of a multi-mode optical fiber, e.g., the multi-mode optical fiber 215A of FIG. 2A.

Referring to FIG. 2C, simulated light intensity profiles of some of the light beams 230A, 230B and 230C respectively at 100, 150, 200 microns between the aperture 205 and the sources are shown.

Referring again to FIG. 2A, another end or a top surface of the multi-mode optical fiber 215 may be terminated with a relatively large area detector, an integrating sphere detector, or a lensed detector to ensure more or less normal incidence of light on a detector surface. The detector may be made of InGaAs to ensure sufficient signal-to-noise ratio, or of Ge to save costs. To improve signal-to-noise ratio of a relatively small detector, light modulation techniques utilizing a lock-in amplifier may be used in the apparatus 200.

FIGS. 3-6 show cross-section views of apparatuses 300, 400, 500 and 600 for wafer level beam profile characterization according to other aspects of the present disclosure.

Referring to FIG. 3, the apparatus 300 includes an aperture 305, a lens 310, a curved light pipe 315 and a multi-mode optical fiber 320.

The apparatus 300 is insertable into a trench disposed through a waveguide of an edge emitting integrated laser, and is movable in the trench to scan a light beam emitted from the waveguide for wafer level beam profile characterization of the light beam.

The aperture 305 allows a portion of the emitted light beam to pass through the aperture 305 to the lens 310. The lens 310 arrests divergence of the light beam passed through the aperture 305 and redirects or focuses the light beam to the curved light pipe 315. The curved light pipe 315 is curved so that one end is disposed at a relatively small angle with respect to an optical axis of a core of the multi-mode optical fiber 320. The redirected light beam is transported along a path of the curved light pipe 315 to the core of the multi-mode optical fiber 320.

Referring to FIG. 4, the apparatus 400 includes an aperture 405, a lens 410, a folding prism 415, a collimating lens 420 and a multi-mode optical fiber 425.

The apparatus 400 is insertable into a trench disposed through a waveguide of an edge emitting integrated laser, and is movable in the trench to scan a light beam emitted from the waveguide for wafer level beam profile characterization of the light beam.

The aperture 405 allows a portion of the emitted light beam to pass through the aperture 405 to the lens 410. The lens 410 arrests divergence of the light beam passed through the aperture 405 and redirects or focuses the light beam to the folding prism 415. The folding prism 415 is folded so that one end is disposed at a relatively small angle with respect to an optical axis of a core of the multi-mode optical fiber 425. The redirected light beam is reflected in the folding prism 415 to the collimating lens 420. The collimating lens 420 is disposed on a bottom surface of the multi-mode optical fiber 425, and narrows the reflected light beam to be more aligned with the core of the multi-mode optical fiber 425.

Figure 5:
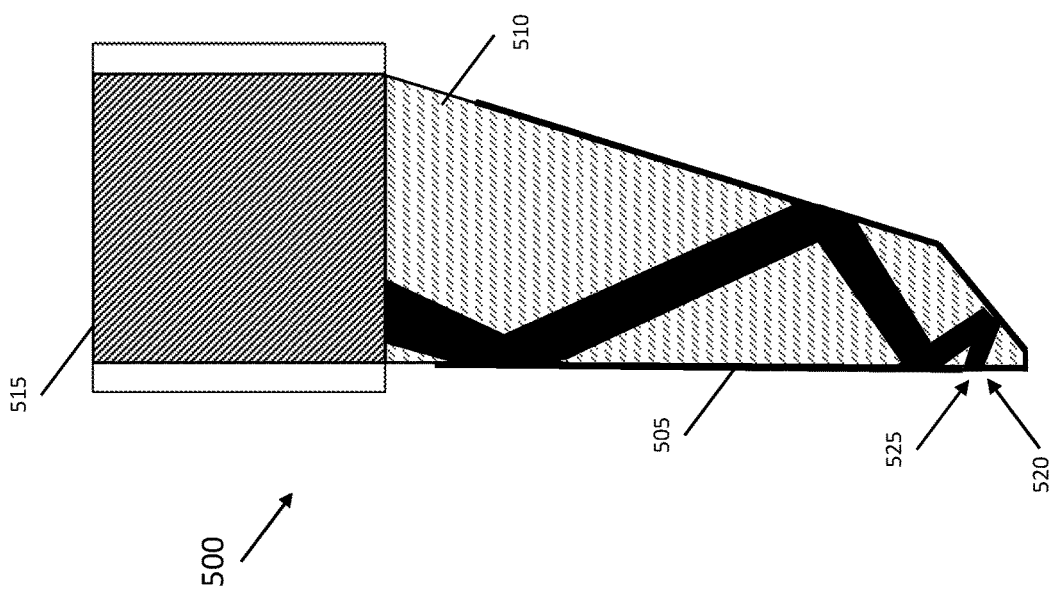

Referring to FIG. 5, the apparatus 500 includes metal layers 505 disposed on a prism 510 that is flared out from a bottom surface of a multi-mode optical fiber 515. The metal layers 505 include an aperture 520 disposed through a surface of the metal layers 505.

The aperture 520 allows a light beam 525 from a waveguide of an edge emitting integrated laser to pass through the metal layers 505 and into the prism 510. In the prism 510, multiple reflections of the light beam 525 passed through the aperture 520 ensure relatively shallow angles of incidence on a core the multi-mode optical fiber 515. The prism 510 may be relatively easy to manufacture as it does not require a lens.

The prism 510 is fully metalized with the metal layers 505, except for the small aperture 520 at a front end, so that the metal layers 505 block a light beam having a relatively incident angle from entering the prism 510. Further, the metal layers 505 reflect the light beam 525 passed through the aperture 520. The prism 510 is also "flared out" from the multi-mode optical fiber 515 in the sense that a first portion closer to the fiber 515 has a larger width or cross-sectional distance than a second portion closer to the aperture 520. This makes the apparatus 500 suitable for scanning and moving in x-, y- and z-directions in the trench.

Figure 6:
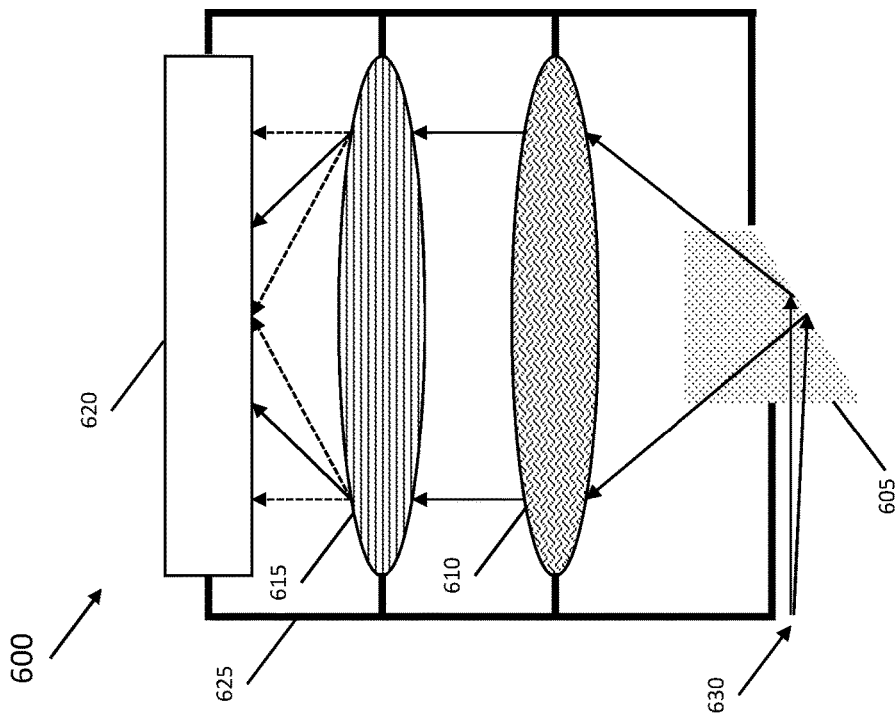

A non-scanning example is shown in FIG. 6.

Referring to FIG. 6, the apparatus 600 includes a folding prism 605, a collimating lens 610 or relay lens, a variable focus lens 615, a camera 620 and a multi-axis alignment device 625.

The folding prism 605 may be inserted into a trench disposed through a waveguide, for wafer level beam profile characterization, and is followed by an imaging beam profiler including the collimating lens 610, the variable focus lens 615 and the camera 620. The folding prism 605 redirects a light beam emitted by the waveguide, to the collimating lens 610.

The collimating lens 610 narrows the redirected light beam to be more aligned with the camera 620.

The variable focus lens 615 is a tunable or focusable lens that changes focal lengths of the narrowed light beam to be imaged by the camera 620 for calculation of an NA or an M squared beam quality factor. Because a focal distance of the system is changed by varying a curvature of the deformable lens 615, the camera 620 may obtain multiple images of a beam spot at the camera 620 needed for M squared measurements. Note that the camera 620 does not have to scan in a plane across the light beam, thereby allowing fast, high volume production. Because the light beam is changed by the focusable lens 615, the camera 620 does not have to be moved in an axial direction colinear to the light beam, also allowing fast, high volume production.

The camera 620 may include a digital camera including a CCD or a complementary metal oxide semiconductor (CMOS) sensor.

The multi-axis alignment device 625 connects the folding prism 605, the collimating lens 610, the variable focus lens 615 and the camera 620 to each other and aligns these elements for wafer level beam profile characterization. The multi-axis alignment device 625 also moves the folding prism 605 into the trench in x-, y- and z-directions to analyze the light beam. In embodiments, the multi-axis alignment device 625 may include a coarse and/or piezo motor system.

The apparatus 600 is different from the above-described apparatuses as it does not include an aperture, avoiding time-consuming scanning and thereby allowing fast, high volume production.

Figure 7:
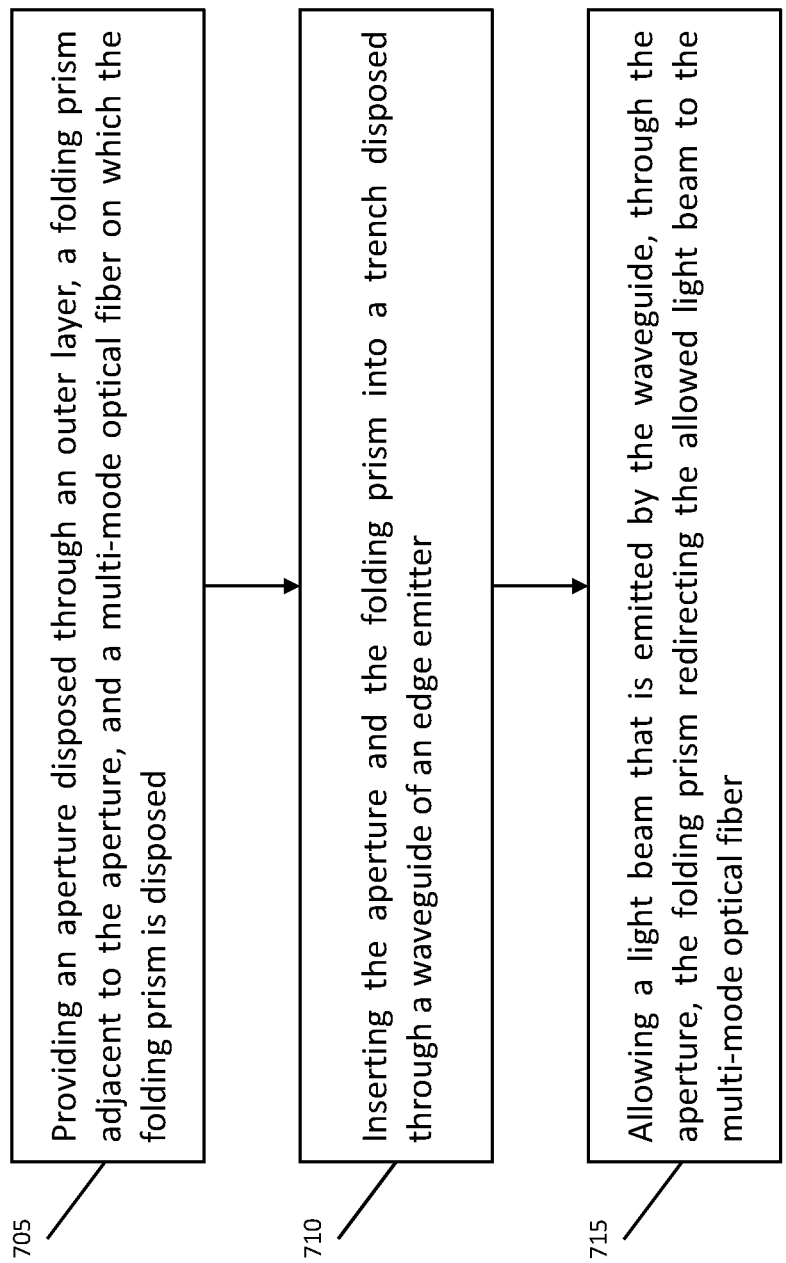
FIG. 7 shows a flow diagram of a method of wafer level beam profile characterization according to aspects of the present disclosure.

FIG. 7 shows a flow diagram of a method of wafer level beam profile characterization according to aspects of the present disclosure.

Operation 705 may be directed to providing an aperture disposed through an outer layer, a folding prism adjacent to the aperture, and a multi-mode optical fiber on which the folding prism is disposed.

Operation 710 may be directed to inserting the aperture and the folding prism into a trench disposed through a waveguide of an edge emitting integrated laser.

Operation 715 may be directed to allowing a light beam that is emitted by the waveguide, through the aperture, the folding prism redirecting the allowed light beam to the multi-mode optical fiber or fiber arrays.

The light beam may be redirected to be incident on a core of the multi-mode optical fiber at acute angles with respect to an optical axis of the multi-mode optical fiber.

The method may further include providing a metal layer disposed on the outer layer and through which the aperture is disposed, the metal layer reflecting another light beam.

The method may further include providing a metal layer disposed on a surface of the folding prism, the metal layer reflecting the allowed light beam.

The method may further include providing a lens interposed between the aperture and the folding prism, the lens arresting divergence of the allowed light beam and focus, to the folding prism, the light beam having the arrested divergence.

The folding prism may be replaced by a curved light pipe.

The method may further include providing a collimating lens disposed on the multi-mode optical fiber, the collimating lens narrowing the focused light beam to be aligned with a core of the multi-mode optical fiber.

The outer layer may include a metal layer disposed on the folding prism, the metal layer reflecting another light beam.

The folding prism may include a first portion adjacent to the multi-mode optical fiber, and a second portion adjacent to the aperture, and a width of the first portion is larger than a width of the second portion.

The methods and sequence of steps presented above are intended to be examples for beam profile characterization according to the present disclosure. It will be apparent to those ordinary skilled practitioners that the foregoing process operations may be modified without departing from the spirit of the present disclosure.

The apparatuses and methods describe above include a microprism that redirects a light beam from an adjacent edge emitting integrated laser upward, which allows for optical bench testing at a wafer level.

The apparatuses and methods listed above can be extended to simultaneous testing of multiple structures (e.g., lasers and waveguides) in an array for multi-channel designs, further increasing throughput of the testing and decreasing cost.

To more readily understand and put into practical effect the present apparatuses and methods, particular aspects will now be described by way of examples. For the sake of brevity, duplicate descriptions of features and properties may be omitted.

Examples

Example 1 provides an apparatus including an aperture disposed through an outer layer, a folding prism adjacent to the aperture, and a multi-mode optical fiber on which the folding prism is disposed. The aperture and the folding prism are insertable into a trench disposed through a waveguide of an edge emitting integrated laser, the aperture is configured to allow a light beam that is emitted by the waveguide, through the aperture, and the folding prism is configured to redirect the allowed light beam to the multi-mode optical fiber.

Example 2 may include the apparatus of example 1 and/or any other example disclosed herein, for which the light beam is redirected to be incident on a core of the multi-mode optical fiber at acute angles with respect to an optical axis of the multi-mode optical fiber.

Example 3 may include the apparatus of example 1 and/or any other example disclosed herein, for which the apparatus further includes a metal layer disposed on the outer layer and through which the aperture is disposed, and the metal layer is configured to reflect another light beam.

Example 4 may include the apparatus of example 1 and/or any other example disclosed herein, for which the apparatus further includes a metal layer disposed on a surface of the folding prism, and the metal layer is configured to reflect the allowed light beam.

Example 5 may include the apparatus of example 1 and/or any other example disclosed herein, for which the apparatus further includes a lens interposed between the aperture and the folding prism, and configured to arrest divergence of the allowed light beam and focus, to the folding prism, the light beam having the arrested divergence.

Example 6 may include the apparatus of example 5 and/or any other example disclosed herein, for which the folding prism includes a curved light pipe.

Example 7 may include the apparatus of example 5 and/or any other example disclosed herein, for which the apparatus further includes a collimating lens disposed on the multi-mode optical fiber, and configured to narrow the focused light beam to be aligned with a core of the multi-mode optical fiber.

Example 8 may include the apparatus of example 1 and/or any other example disclosed herein, for which the outer layer includes a metal layer disposed on the folding prism, and the metal layer is configured to reflect another light beam.

Example 9 may include the apparatus of example 1 and/or any other example disclosed herein, for which the folding prism includes a first portion adjacent to the multi-mode optical fiber, and a second portion adjacent to the aperture, and a width of the first portion is larger than a width of the second portion.

Example 10 provides a method including providing an aperture disposed through an outer layer, providing a folding prism adjacent to the aperture, and providing a multi-mode optical fiber on which the folding prism is disposed. The method further includes inserting the aperture and the folding prism into a trench disposed through a waveguide of an edge emitting integrated laser, and allowing a light beam that is emitted by the waveguide, through the aperture, the folding prism redirecting the allowed light beam to the multi-mode optical fiber.

Example 11 may include the apparatus of example 10 and/or any other example disclosed herein, for which the light beam is redirected to be incident on a core of the multi-mode optical fiber at acute angles with respect to an optical axis of the multi-mode optical fiber.

Example 12 may include the apparatus of example 10 and/or any other example disclosed herein, for which the method further includes providing a metal layer disposed on the outer layer and through which the aperture is disposed, the metal layer reflecting another light beam.

Example 13 may include the apparatus of example 10 and/or any other example disclosed herein, for which the method further includes providing a metal layer disposed on a surface of the folding prism, the metal layer reflecting a portion of the allowed light beam.

Example 14 may include the apparatus of example 10 and/or any other example disclosed herein, for which the method further includes providing a lens interposed between the aperture and the folding prism, the lens arresting divergence of the allowed light beam and focus, to the folding prism, the light beam having the arrested divergence.

Example 15 may include the apparatus of example 14 and/or any other example disclosed herein, for which the folding prism includes a curved light pipe.

Example 16 may include the apparatus of example 14 and/or any other example disclosed herein, for which the method further includes providing a collimating lens disposed on the multi-mode optical fiber, the collimating lens narrowing the focused light beam to be aligned with a core of the multi-mode optical fiber.

Example 17 may include the apparatus of example 10 and/or any other example disclosed herein, for which the outer layer includes a metal layer disposed on the folding prism, the metal layer reflecting another light beam.

Example 18 may include the apparatus of example 10 and/or any other example disclosed herein, for which the folding prism includes a first portion adjacent to the multi-mode optical fiber, and a second portion adjacent to the aperture, and a width of the first portion is larger than a width of the second portion.

Example 19 provides an apparatus including a folding prism insertable into a trench disposed through a waveguide of an edge emitting integrated laser, and configured to redirect a light beam that is emitted by the waveguide, a collimating lens configured to narrow the redirected light beam, and a variable focus lens configured to change focal lengths of the narrowed light beam. The apparatus further includes a camera configured to image the light beam having the changed focal length.

Example 20 may include the apparatus of example 19 and/or any other example disclosed herein, for which the apparatus further includes a multi-axis alignment device connecting and aligning the folding prism, the collimating lens, the variable focus lens and the camera, and the multi-axis alignment device is configured to move the folding prism into the trench to scan the light beam.

It will be understood that any property described herein for a specific device may also hold for any device described herein. It will also be understood that any property described herein for a specific method may hold for any of the methods described herein. Furthermore, it will be understood that for any device or method described herein, not necessarily all the components or operations described will be enclosed in the device or method, but only some (but not all) components or operations may be enclosed.

The term "comprising" shall be understood to have a broad meaning similar to the term "including" and will be understood to imply the inclusion of a stated integer or operation or group of integers or operations but not the exclusion of any other integer or operation or group of integers or operations. This definition also applies to variations on the term "comprising" such as "comprise" and "comprises".

The term "coupled" (or "connected") herein may be understood as electrically coupled or as mechanically coupled, e.g., attached or fixed or attached, or just in contact without any fixation, and it will be understood that both direct coupling or indirect coupling (in other words: coupling without direct contact) may be provided.

While the present disclosure has been particularly shown and described with reference to specific aspects, it should be understood by those skilled in the art that various changes in form and detail may be made therein without departing from the spirit and scope of the present disclosure as defined by the appended claims. The scope of the present disclosure is thus indicated by the appended claims and all changes which come within the meaning and range of equivalency of the claims are therefore intended to be embraced.

What is claimed is:

1. An apparatus comprising:
   an aperture disposed through an outer layer;
   a metal layer disposed on the outer layer and through which the aperture is disposed;
   a folding prism adjacent to the aperture; and
   a multi-mode optical fiber on which the folding prism is disposed,
   wherein the aperture and the folding prism are insertable into a trench disposed through a waveguide of an edge emitting integrated laser,
   the aperture is configured to allow a light beam that is emitted by the waveguide, through the aperture,
   the folding prism is configured to redirect the allowed light beam to the multi-mode optical fiber, and
   the metal layer is configured to reflect another light beam.

2. The apparatus of claim 1, wherein the light beam is redirected to be incident on a core of the multi-mode optical fiber at acute angles with respect to an optical axis of the multi-mode optical fiber.

3. The apparatus of claim 1, further comprising a metal layer disposed on a surface of the folding prism,
   wherein the metal layer is configured to reflect a portion of the allowed light beam.

4. The apparatus of claim 1, further comprising a lens interposed between the aperture and the folding prism, and configured to arrest divergence of the allowed light beam and focus, to the folding prism, the light beam having the arrested divergence.

5. The apparatus of claim 4, wherein the folding prism comprises a curved light pipe.

6. The apparatus of claim 4, further comprising a collimating lens disposed on the multi-mode optical fiber, and configured to narrow the focused light beam to be aligned with a core of the multi-mode optical fiber.

7. The apparatus of claim 1, wherein the outer layer comprises a metal layer disposed on the folding prism, and the metal layer is configured to reflect another light beam.

8. The apparatus of claim 1, wherein the folding prism comprises:
   a first portion adjacent to the multi-mode optical fiber; and
   a second portion adjacent to the aperture, and
   a width of the first portion is larger than a width of the second portion.

9. A method comprising:
   providing an aperture disposed through an outer layer;
   providing a metal layer disposed on the outer layer and through which the aperture is disposed;
   providing a folding prism adjacent to the aperture;
   providing a multi-mode optical fiber on which the folding prism is disposed;
   inserting the aperture and the folding prism into a trench disposed through a waveguide of an edge emitting integrated laser;
   allowing a light beam that is emitted by the waveguide, through the aperture, the folding prism redirecting the allowed light beam to the multi-mode optical fiber; and
   reflecting another light beam with the metal layer.

10. The method of claim 9, wherein the light beam is redirected to be incident on a core of the multi-mode optical fiber at acute angles with respect to an optical axis of the multi-mode optical fiber.

11. The method of claim 9, further comprising providing a metal layer disposed on a surface of the folding prism, the metal layer reflecting a portion of the allowed light beam.

12. The method of claim 9, further comprising providing a lens interposed between the aperture and the folding prism, the lens arresting divergence of the allowed light beam and focus, to the folding prism, the light beam having the arrested divergence.

13. The method of claim 12, wherein the folding prism comprises a curved light pipe.

14. The method of claim 12, further comprising providing a collimating lens disposed on the multi-mode optical fiber, the collimating lens narrowing the focused light beam to be aligned with a core of the multi-mode optical fiber.

15. The method of claim 9, wherein the outer layer comprises a metal layer disposed on the folding prism, the metal layer reflecting another light beam.

16. The method of claim 9, wherein the folding prism comprises:
   a first portion adjacent to the multi-mode optical fiber; and
   a second portion adjacent to the aperture, and
   a width of the first portion is larger than a width of the second portion.

* * * * *